(No Model.)
C. E. WHITAKER.
BICYCLE.
No. 519,855. Patented May 15, 1894.
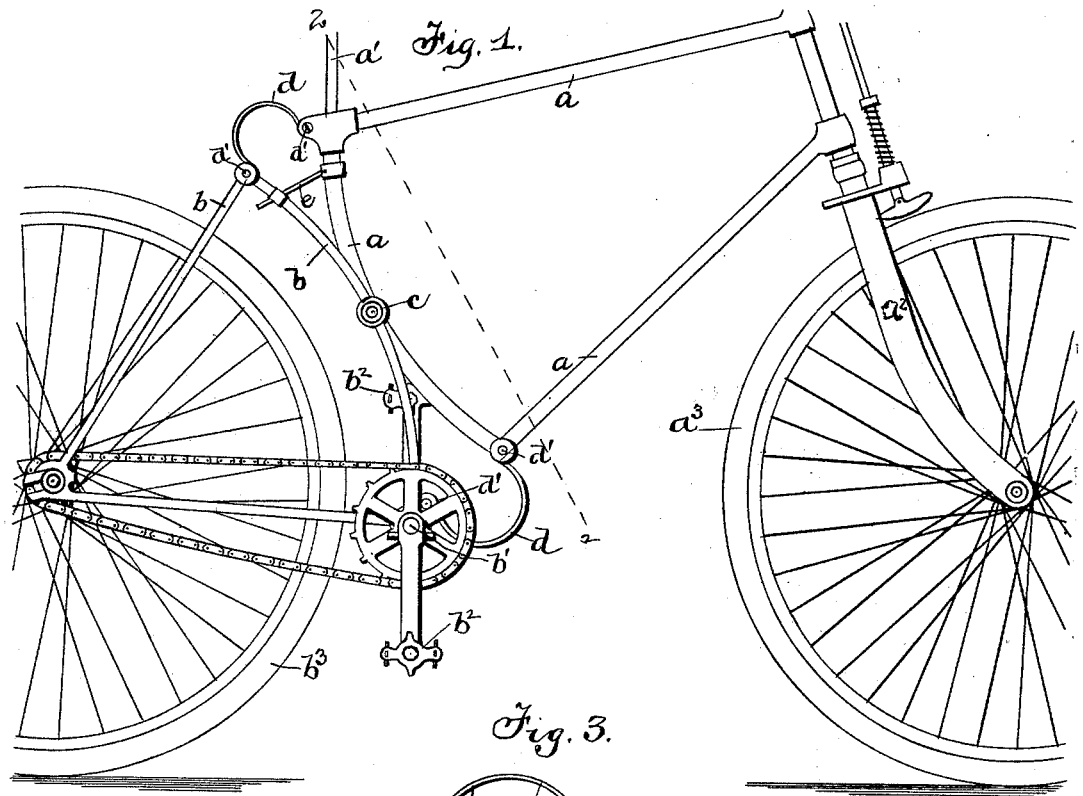
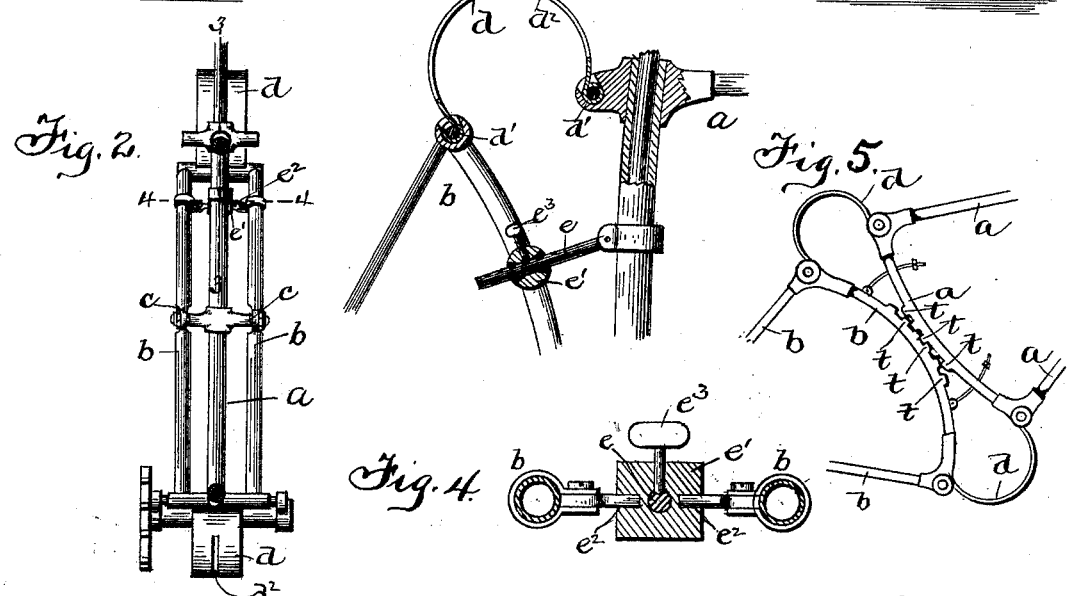
Witnesses
H. J. Seitz
A. W. Harrison
Inventor
Clarence E. Whitaker,
by Wright Brown & Coesley
his Attorneys.

UNITED STATES PATENT OFFICE.

CLARENCE E. WHITAKER, OF LYNN, MASSACHUSETTS, ASSIGNOR TO JOSIAH C. BENNETT, OF SAME PLACE.

BICYCLE.

SPECIFICATION forming part of Letters Patent No. 519,855, dated May 15, 1894.

Application filed September 19, 1893. Serial No. 485,929. (No model.)

*To all whom it may concern:*

Be it known that I, CLARENCE E. WHITAKER, of Lynn, in the county of Essex and State of Massachusetts, have invented certain new and useful Improvements in Bicycles, of which the following is a specification.

My invention relates to bicycles, and has particular reference to the construction of the frame thereof.

In bicycles having rigid frames, it is customary to employ saddles having a great amount of elasticity, in order to neutralize the jars and jolts when riding over an uneven road. The resulting constant change of distance between the saddle and pedals is an annoyance and a cause of fatigue, and frequently results in throwing the feet of the rider off from the pedals. To overcome these objections, and also to relieve the frame itself from some of the wearing rattling to which it is subjected, the frame has been made in sections yieldingly connected together; but in most such constructions there is a looseness in the frame, which results in or permits a lateral or torsional movement of one section with respect to the other; and when riding rapidly, the machine is liable to "wabble" and throw the feet off the pedals or throw the rider completely.

The object of my invention is to obtain a desirable elasticity or vertical yielding movement of the frame, and at the same time overcome all the above-mentioned objections, by constructing the frame in sections pivotally connected together between the saddle and the crank shaft, and yieldingly connecting the sections on both sides of the pivotal point, thus forming three points of connection, which will afford the desired effect as to elasticity and will also afford sufficient lateral support and prevent any tendency to wabble.

To these ends my invention consists in the construction and combination of parts substantially as hereinafter described and claimed.

In the accompanying drawings: Figure 1 is a side elevation of so much of the complete bicycle as is necessary to illustrate my invention. Fig. 2 is a detail section on line 2—2 of Fig. 1, looking toward the left. Fig. 3 is an enlarged detail section on line 3—3 of Fig. 2. Fig. 4 is an enlarged detail section on line 4—4 of Fig. 2. Fig. 5 represents a modification.

The same reference letters indicate the same parts in the several views.

$a$ represents the front section of the frame having a seat support $a'$ and a bearing for the head of the front fork $a^2$, which supports the axle of the front wheel $a^3$.

$b$ represents the rear section of the frame having a bearing for the crank shaft $b'$ which is provided with the usual pedals $b^2$, and this frame $b$ is also forked and supports the axle of the rear wheel $b^3$. An ordinary sprocket and chain connection is represented as provided for the communication of power from the crank shaft to the rear wheel. The front portion of the rear section is preferably composed of two parallel curved rods having, near their center, bearings for trunnions $c\ c$ carried by the rear curved rod of the front section. Above and below the joint or hinge thus formed, the two sections are connected by broad flat curved springs $d\ d$, each end of each spring being preferably connected to the frame by a pin $d'$ secured in the frame and having the end of the spring bent around it, whereby a pivotal connection is formed that will permit the springs to yield properly. These springs, being broad, and having long bearings on the pins $d'$, relieve the trunnions $c\ c$ from much of the torsional strain to which they may, at times, be subjected, and said springs may be cut away, as at $d^2$, if desired, to increase the elasticity of the spring and render it less liable to be broken. The springs, in practice, are curved and tempered so that their shape, even before the parts are assembled, will be substantially semi elliptic or substantially U-shaped as shown in the drawings; such change in shape as they undergo when put in place being only due to the weight of the frame. It therefore follows that not only do both springs oppose further downward movement under weight in the saddle, but both also oppose a rise above normal position, if the machine is subjected to a sudden jolt.

In order that the two sections may be locked together and the springs kept out of action, I pivotally connect a bolt $e$ with the rear bar of the front section, and support a block $e'$ upon trunnions $e^2$ $e^2$ carried by the curved rods of the rear section. The block $e'$ is provided with a hole through which the bolt $e$ passes and reciprocates freely when the springs are in action, while a set screw $e^3$ tapped through the block to the bolt hole may be turned down to bear against the bolt, and thus lock the sections against movement at the joint or hinge. The object of pivotally supporting the bolt and block is to permit them to accommodate themselves to changing relative positions during movement of the sections on their jointed connection at $c$.

In Fig. 5, I show, as a modification, an equivalent of the pivotal connection shown in Figs. 1 and 2, said modification comprising intermeshing gear teeth $t\,t$, formed on the adjacent parts of said sections. Said gear teeth permit movements of the sections similar to the movements permitted by the trunnions $c\,c$. It will be seen, therefore, that by the term "pivotally connected," as used in the following claims, I mean any connection between the two sections which will permit the described upward and downward movement of the meeting portions of said sections.

I claim—

1. A bicycle comprising in its construction rigid front and rear frame sections having a rocking connection with each other at a point substantially in a line between the seat support and the crank shaft, and semi-elliptic springs having their ends pivotally connecting the said sections above and below the connection, said springs being adapted to yieldingly oppose relative movement of the sections in either direction, for the purpose set forth.

2. A bicycle comprising in its construction rigid front and rear frame sections pivotally connected together at a point substantially in a line between the seat support and the crank shaft, and broad, flat, curved springs connecting the said sections above and below the pivotal connection, whereby torsional strain on the pivotal connection is relieved, substantially as described.

3. A bicycle comprising in its construction rigid front and rear sections pivotally connected together below the seat support, springs for yieldingly opposing movement on the said pivotal connection, a block pivotally supported by one of said sections and having a hole, a bolt pivotally connected with the other section and extending through said hole, and means for rigidly securing the bolt in said block hole, substantially as described.

4. A bicycle comprising in its construction rigid front and rear frame sections having a rocking connection with each other at a point substantially in a line between the seat support and the crank shaft, and springs connecting the said sections above and below the rocking connection, each spring being adapted to act alternately as an expansion and compression spring, whereby the springs will simultaneously oppose relative movement of the sections in either direction, for the purpose set forth.

In testimony whereof I have signed my name to this specification, in the presence of two subscribing witnesses, this 21st day of August, A. D. 1893.

CLARENCE E. WHITAKER.

Witnesses:
 C. F. BROWN,
 M. W. JACKSON.